United States Patent [19]

Kayanuma

[11] Patent Number: 5,207,057
[45] Date of Patent: May 4, 1993

[54] AIR-FUEL RATIO CONTROL DEVICE FOR AN ENGINE

[75] Inventor: Nobuaki Kayanuma, Gotenba, Japan

[73] Assignee: Toyota Jidosha Kabushiki Kaisha, Aichi, Japan

[21] Appl. No.: 882,014

[22] Filed: May 13, 1992

[30] Foreign Application Priority Data

May 16, 1991 [JP] Japan .................................. 3-111852

[51] Int. Cl.⁵ .............................................. F01N 3/20
[52] U.S. Cl. ........................................ 60/276; 60/285; 123/692
[58] Field of Search .................. 60/276, 285; 123/691, 123/692

[56] References Cited

U.S. PATENT DOCUMENTS 4,739,614  4/1988  Katsuno et al. .................. 60/274
5,074,113  12/1991  Matsuoka et al. .................. 60/276

FOREIGN PATENT DOCUMENTS

| 60-231155 | 11/1985 | Japan . |
|---|---|---|
| 61-286550 | 11/1985 | Japan . |
| 61-185634 | 8/1986 | Japan . |
| 62-29711 | 2/1987 | Japan . |
| 63-97852 | 4/1988 | Japan . |
| 63-79448 | 5/1988 | Japan . |
| 63-147941 | 6/1988 | Japan . |
| 63-115556 | 7/1988 | Japan . |
| 1-8332 | 1/1989 | Japan . |
| 1-110852 | 4/1989 | Japan . |
| 1-134046 | 5/1989 | Japan . |
| 2-30915 | 2/1990 | Japan . |
| 2-33408 | 2/1990 | Japan . |
| 2-91440 | 3/1990 | Japan . |
| 2-207159 | 8/1990 | Japan . |
| 3-268425 | 2/1991 | Japan . |
| 3-57862 | 3/1991 | Japan . |
| 3-134241 | 6/1991 | Japan . |
| 3-199643 | 8/1991 | Japan . |
| 3-286160 | 12/1991 | Japan . |

*Primary Examiner*—Douglas Hart
*Attorney, Agent, or Firm*—Oliff & Berridge

[57] ABSTRACT

An air-fuel ratio control device for an engine having two or more cylinder groups, such as a V-type engine or a horizontally opposed engine, wherein the air-fuel ratio control device controls the air-fuel ratio of cylinder groups in accordance with the output of upstream air-fuel ratio sensors and a downstream air-fuel ratio sensor. The upstream air-fuel ratio sensors are disposed in the individual exhaust passage connected to the respective cylinders upstream of the catalyst converter. The downstream air-fuel ratio sensor is disposed in the common exhaust passage downstream of the catalyst converter. The air-fuel control device usually controls the air-fuel ratios of individual cylinder groups in accordance with the output of the respective upstream air-fuel ratio sensor. When a determination of whether or not the catalyst converter has deteriorated is required, the air-fuel ratio control device controls the air-fuel ratio of all cylinder groups in accordance with the output of either one of upstream air-fuel ratio sensors, whereby the air fuel ratio of the exhaust gas flow into the catalyst converter is changed at a predetermined frequency (period). In this condition, the air-fuel ratio control device determines whether or not the catalyst converter has deteriorated by comparing the outputs of the upstream air-fuel ratio sensor and the downstream air-fuel ratio sensor.

20 Claims, 13 Drawing Sheets

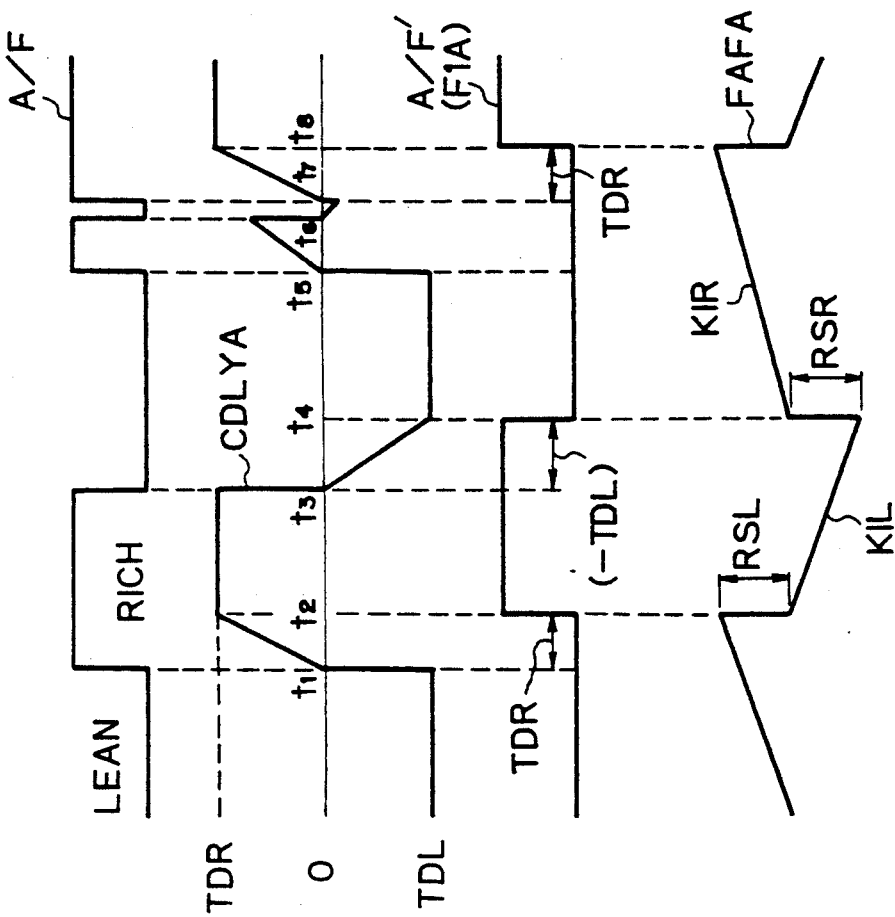

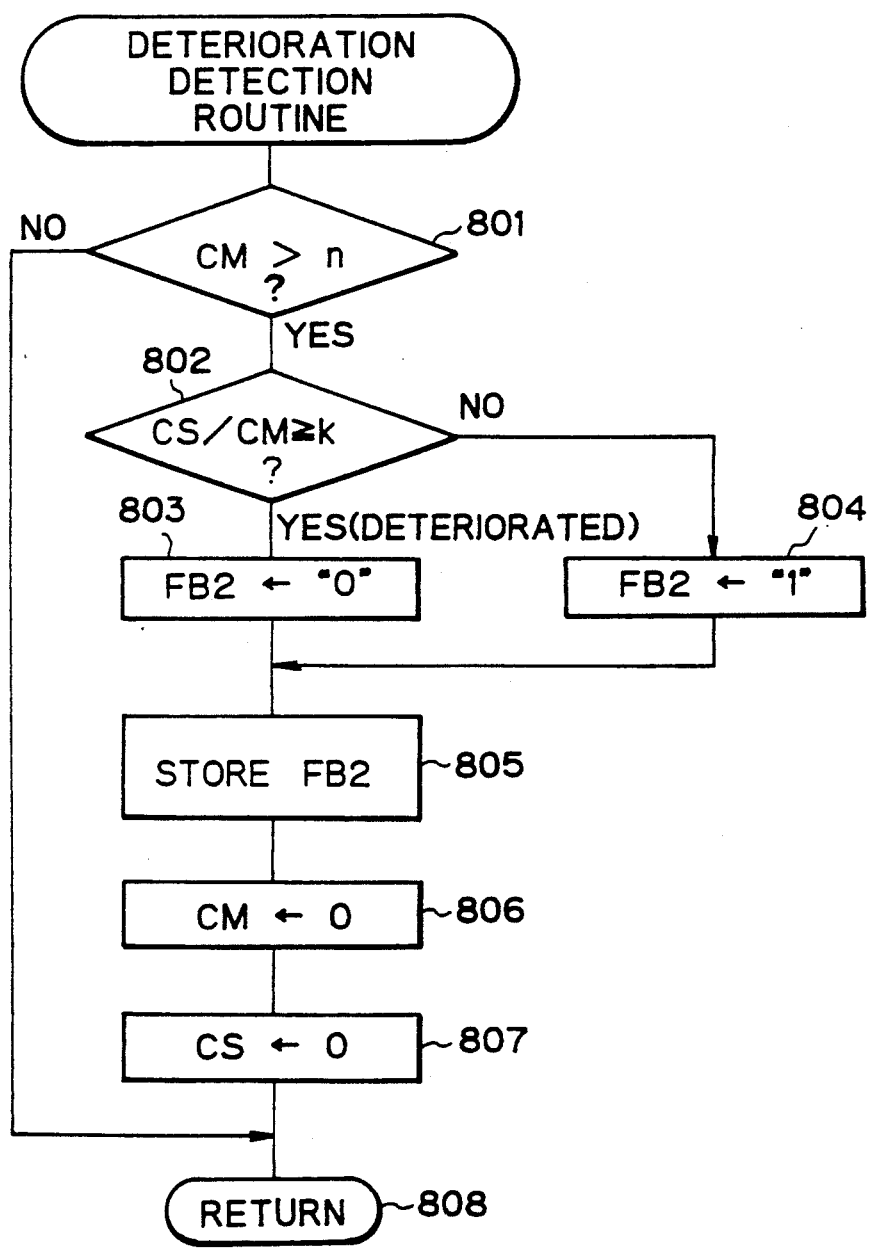

AIR-FUEL RATIO CONTROL DEVICE FOR AN ENGINE

BACKGROUND OF THE INVENTION

1. Field of the Invention

The present invention relates to an air-fuel ratio control device for an engine, and more particularly, relates to an air-fuel ratio control device for an engine having cylinders divided into cylinder groups such as a V-type engine or a horizontally opposed engine, which device is capable of detecting a deterioration of a catalyst converter disposed in an exhaust passage of the engine.

2. Description of the Related Art

An air-fuel ratio control device using one air-fuel ratio sensor ($O_2$ sensor) disposed in an exhaust gas passage is known as a single $O_2$ sensor system.

In the single $O_2$ sensor system, usually the $O_2$ sensor is disposed in an exhaust passage near to cylinders, i.e., in an exhaust manifold near the point at which the exhaust pipes from the cylinders are merged. In such a system, the accuracy of the air-fuel ratio control is affected by individual differences in the characteristics of the parts of the engine, such as the $O_2$ sensor, the fuel injection valves, and individual changes due to the aging of these parts.

To compensate for these individual differences or changes due to aging, a double $O_2$ sensor system using two $O_2$ sensors has been proposed (U.S. Pat. No. 4739614). In this double $O_2$ sensor system, $O_2$ sensors are disposed upstream and downstream of the catalyst converter in the exhaust passage, and the air-fuel ratio control operation is carried out by the downstream $O_2$ sensor together with the upstream $O_2$ sensor. In the double $O_2$ sensor system, although the downstream $O_2$ sensor has lower response speed characteristics when compared with the upstream $O_2$ sensor, the downstream $O_2$ sensor has an advantage in that the output fluctuation characteristics are small compared with those of the upstream $O_2$ sensor, for the following reasons:

(1) On the downstream side of the catalyst converter, the temperature of the exhaust gas is low, and thus the downstream $O_2$ sensor is not affected by a high temperature exhaust gas.

(2) On the downstream side of the catalyst converter, although various kinds of pollutants are trapped in the catalyst converter, these pollutants have little affect on the downstream $O_2$ sensor.

(3) On the downstream side of the catalyst converter, the exhaust gas is mixed and reacted so that the concentration of oxygen in the exhaust gas is approximately in an equilibrium state.

Therefore, according to the double $O_2$ sensor system, the fluctuation of the output of the upstream $O_2$ sensor is compensated by a feedback control using the output of the downstream $O_2$ sensor. Actually, as illustrated in FIG. 10, in the worst case, the deterioration of the output characteristics of the $O_2$ sensor in a single $O_2$ sensor system directly effects a deterioration in the emission characteristics. On the other hand, in a double $O_2$ sensor system, even when the output characteristics of the upstream $O_2$ sensor are deteriorated, the emission characteristics are not deteriorated. That is, in a double $O_2$ sensor system, even if only the output characteristics of the downstream $O_2$ are stable, good emission characteristics are still obtained.

Nevertheless, even in the above-mentioned double $O_2$ sensor system, if the catalyst in the catalyst converter is deteriorated, the condition of the exhaust emissions such as HC, CO, $NCO_x$ is worsened, and accordingly, the output characteristics of the downstream $O_2$ sensor are deteriorated, i.e., the amplitude of the output voltage $V_2$ of the downstream $O_2$ sensor becomes larger and the period of oscillation of same becomes smaller. Therefore, in the above-mentioned double $O_2$ sensor system, the deterioration of the catalyst can be detected by comparing the periods of the oscillation of the outputs of upstream $O_2$ sensor and downstream $O_2$ sensor.

In the system disclosed in U.S. Pat. No. 4,739,614, it is determined that the catalyst is deteriorated, when the ratio of the period $T_1$ of the oscillation of the output of the upstream $O_2$ sensor to the period $T_2$ of the oscillation of the output of the downstream $O_2$ sensor, i.e., $T_1/T_2$, becomes larger than a predetermined value (or, alternatively, when the period $T_2$ of the output of the downstream $O_2$ sensor becomes smaller than a predetermined value).

The double $O_2$ sensor system is also used for V-type engines or horizontally opposed engines, in which the cylinders of the engine are divided into two or more cylinder groups. In this case, upstream $O_2$ sensors are disposed in the exhaust passages connected to respective cylinder groups, and one downstream $O_2$ sensor common to the cylinder groups is disposed in a common exhaust passage at which said exhaust passages of the cylinder groups are merged (this type of double $O_2$ sensor system is called a "Triple $O_2$ sensor system"). (Japanese Unexamined Patent Publication No. 64-8332).

When the double $O_2$ sensor system is used for the engines having two or more groups of cylinders (i.e., triple $O_2$ sensor system), however, the frequency and the period of the outputs of respective upstream $O_2$ sensors do not coincide, since the air-fuel ratio of each cylinder group is controlled individually. The exhaust gases from different cylinder groups flow into the common exhaust passage and are mixed with each other. Consequently, the frequency or the period of the output of the downstream $O_2$ sensor does not coincide with any of the outputs of the upstream $O_2$ sensors.

In other words, when the catalyst converter is deteriorated, the output of the downstream $O_2$ sensor fluctuates as the air-fuel ratio of the exhaust gas at the inlet of the catalyst converter changes.

However, in the triple $O_2$ sensor system, the frequency and the period of the change in the air-fuel ratio of the exhaust gas at the inlet of the converter varies widely since the air-fuel ratio of the exhaust gas from respective cylinder groups do not change synchronously. Therefore, the frequency or the period of the output of the downstream $O_2$ sensor also varies widely even if the degree of deterioration of the catalyst converter is the same.

Therefore, in the triple $O_2$ sensor system, it is extremely difficult to detect a deterioration of the catalyst converter by using the output of the downstream $O_2$ sensor.

SUMMARY OF THE INVENTION

In view of the problems of the related art, the object of the invention is to provide an air-fuel ratio control device for an engine having two or more cylinder groups and using three air-fuel ratio sensors (i.e., a triple air-fuel ratio sensor system), and capable of detecting a deterioration of the catalyst.

According to the present invention, there is provided an air-fuel ratio control device for an engine equipped with two or more cylinder groups, individual exhaust passages connected to each respective cylinder group, a common exhaust passage with which the individual exhaust passages are merged, upstream air-fuel ratio sensors disposed in the individual exhaust passages, a downstream air-fuel ratio sensor disposed in the common exhaust passage, and at least one catalyst converter disposed in a flow path of the exhaust gas between the upstream $O_2$ sensors and the downstream $O_2$ sensor.

The air-fuel ratio control device comprises a first air-fuel ratio control means for an individual control of the air-fuel ratio of each cylinder group at least in accordance with the output of the corresponding upstream air-fuel ratio sensor, a second air-fuel ratio control means for simultaneously controlling the air-fuel ratio of all of the cylinder groups when the engine is operated in a predetermined condition, and a deterioration detecting means for determining whether or not the catalyst converter is deteriorated by comparing the outputs of the upstream and downstream air-fuel ratio sensors.

BRIEF DESCRIPTION OF THE DRAWINGS

The present invention will be better understood from the description as set forth hereafter, with reference to the accompanying drawings, in which:

FIGS. 2, 3A, 3B, 4A, 4B, 6A, and 6B, 7 and 8 are flow charts showing the operation of the control circuit in FIG. 1;

FIGS. 5A through 5D are timing diagrams explaining the flow charts of FIGS. 3 and 4;

DESCRIPTION OF THE PREFERRED EMBODIMENTS

Figure 1:
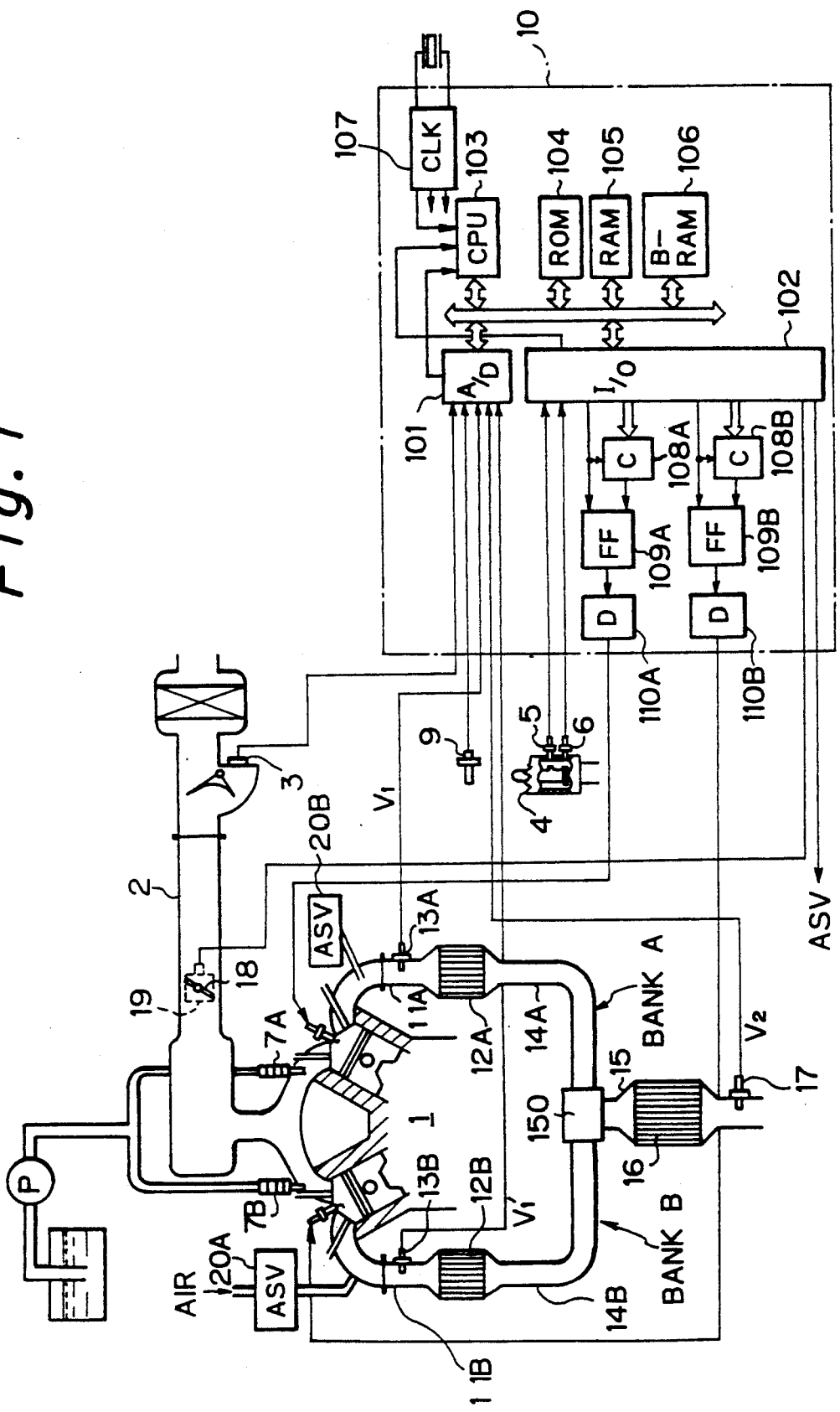
FIG. 1 is a schematic view of an internal combustion engine showing an embodiment of the present invention.

FIG. 1 schematically illustrates an embodiment of the air-fuel ratio control device according to the present invention.

In FIG. 1, reference numeral 1 represents a multiple cylinder V-type automobile engine having two groups of cylinders arranged so as to form two banks of cylinders (designated as bank A and bank B) arranged in a V-shape. An air-intake passage 2 of the engine 1 is provided with a potentiometer-type airflow meter 3 for detecting an amount of air drawn into the engine 1, and generates an analog voltage signal proportional to the amount of air flowing therethrough. The signal from the air-flow meter 3 is transmitted to a multiplexer-incorporating analog-to-digital (A/D) converter 101 of the control circuit 10.

Crankangle sensors 5 and 6, for detecting the angle of the crankshaft (not shown) of the engine 1, are disposed at a distributor 4.

In this case, the crankangle sensor 5 generates a pulse signal at every 720° C. crankangle (CA) and the crankangle sensor 6 generates a pulse signal at every 30° CA. The pulse signals from the crankangle sensors 5 and 6 are supplied to an input/output (I/O) interface 102 of the control circuit 10. Further, the pulse signal of the crankangle sensor 6 is then supplied to an interruption terminal of a central processing unit (CPU) 103.

In the air intake passage 2, fuel injection valves 7A and 7B are provided at inlet ports of the cylinders of bank A and bank B, for supplying pressurized fuel from the fuel system to the cylinders of the engine. Although not clearly shown in FIG. 1, each cylinder of bank A and the bank B is provided with its own fuel injection valve.

A coolant temperature sensor 9 for detecting the temperature of the coolant is disposed in a cylinder block 8 of the engine 1. The coolant temperature sensor 9 generates an analog voltage signal in response to the temperature THW of the coolant, and transmits this signal to the A/D converter 101 of the control circuit 10.

In the exhaust system, three-way reducing and oxidizing catalyst converters 12A and 12B are disposed downstream of the exhaust manifolds 11A and 11B of the banks A and B of the cylinders, respectively. The catalyst converters 12A and 12B are able to remove three pollutants, CO, HC and $NO_x$ from the exhaust gas, simultaneously. The converters 12A and 12B are relatively small in size and are installed in the engine room of the automobile.

An upstream $O_2$ sensor 13A is provided at the exhaust manifold 11A of the bank A, i.e., upstream of the catalyst converter 12A, and an upstream $O_2$ sensor 13B is provided at the exhaust manifold 11B of the bank B, upstream of the catalyst converter 12B.

The exhaust pipes 14A, 14B are connected to the exhaust manifolds 11A, 11B, respectively, and are merged at a common exhaust pipe 15 at a junction portion 150 downstream of the catalyst converters 12A and 12B.

Another three-way reducing and oxidizing catalyst converter 16 is provided on the common exhaust pipe 15. The converter 16 is relatively large in size and is installed underneath the body of the automobile.

A downstream $O_2$ sensor 17 is disposed at the common exhaust pipe 15 downstream of the catalyst converter 16.

The upstream $O_2$ sensors 13A, 13B and the downstream $O_2$ sensor 17 generate output signals corresponding to the concentration of the oxygen component in the exhaust gas. More particularly, the $O_2$ sensors 13A, 13B, and 17 generate output voltage signals which are changed in accordance with whether the air-fuel ratio of the exhaust gas is rich or lean, compared with the stoichiometric air-fuel ratio. The signals output by the $O_2$ sensors 13A, 13B, and 17 are transmitted to the A/D converter 101 of the control circuit 10.

A throttle valve 18, operated by a vehicle driver, is provided in the intake air passage 2 together with an idle switch 19 for detecting the degree of opening of the throttle valve and generating a signal ("LL signal") when the throttle valve 18 is fully closed. This LL signal is supplied to the I/O interface 102 of the control circuit 10.

References 20A, 20B designate secondary air supply valves disposed at the respective exhaust manifolds 11A, 11B, for supplying secondary air to the exhaust manifolds 11A, 11B, to thereby reduce the emission of HC and CO during a deceleration or idling operation of the engine.

The control circuit 10, which may be constructed by a microcomputer, further comprises a central processing unit (CPU) 103, a read-only-memory (ROM) 104 for storing a main routine and interrupt routines such as a fuel injection routine, an ignition timing routine and constants, etc., a random-access-memory 105 (RAM) for storing temporary data, a backup RAM 106, and a clock generator 107 for generating various clock signals. The backup RAM 106 is directly connected to a battery (not shown), and therefore, the content of the backup RAM 106 is preserved even when the ignition switch (not shown) is turned off.

A down counter 108A, a flip-flop 109A, and a drive circuit 110A are provided in the control circuit for controlling the fuel injection valves 7A of the cylinder bank A.

Similarly, a down counter 108B, a flip-flop 109B, a drive circuit 110 are provided in the control circuit 10 for controlling the fuel injection valves 7B of the cylinder bank B.

Namely, when a fuel injection amount TAUA (TAUB) is calculated in a routine, as explained later, the amount TAUA (TAUB) is preset in the down counter 108A (108B), and simultaneously, the flip-flop 109A (109B) is set, and as a result, the drive circuit 110A (110B) initiates the activation of the fuel injection valve 7A (7B). On the other hand, the down counter 108A (108B) counts up the clock signal from the clock generator 107, and finally, a logic "1" signal is generated from the terminal of the down counter 108A (108B), to reset the flip-flop 109A (109B), so that the drive circuit 110A (110B) stops the activation of the fuel injection valve 7A (7B), whereby an amount of fuel corresponding to the fuel injection amount TAUA (TAUB) is supplied to the cylinders of the bank A (bank B).

Interruptions occur at the CPU 103 when the A/D converter 101 completes an A/D conversion and generates an interrupt signal; when the crankangle sensor 6 generates a pulse signal; and when the clock generator 107 generates a special clock signal.

The intake air amount data Q from the airflow meter 3 and the coolant temperature data THW from the coolant sensor 9 are fetched by an A/D conversion routine(s) executed at predetermined intervals, and then stored in the RAM 105; i.e., the data Q and THW in RAM 105 are renewed at predetermined intervals. The engine speed $N_e$ is calculated by an interrupt routine executed at 30° CA, i.e., at every pulse signal of the crank angle sensor 6, and is stored in the RAM 105.

The operation of the control circuit 10 of FIG. 1 is now explained.

Figure 2:
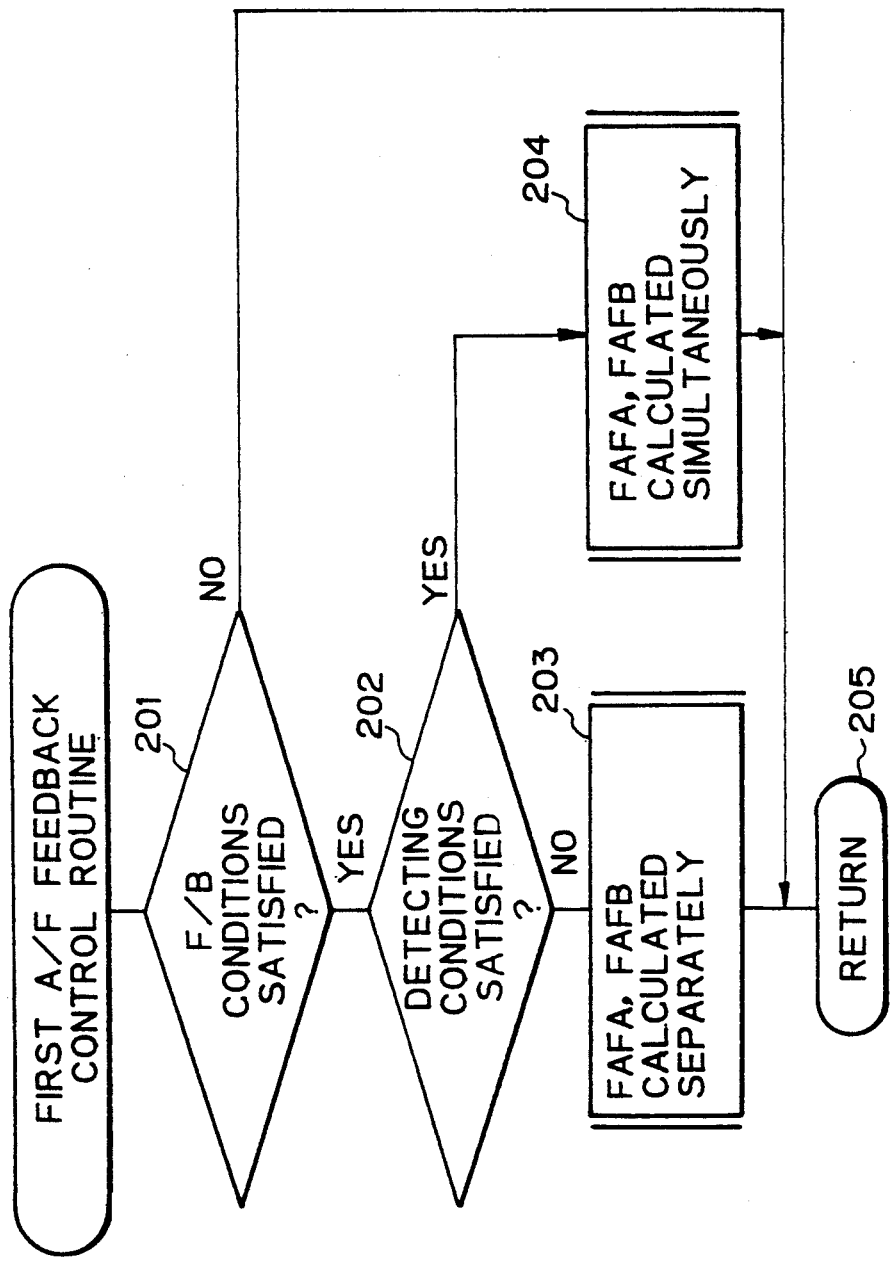

FIG. 2 shows a routine for calculating air-fuel ratio correction factors FAFA and FAFB for cylinder banks A and B, respectively, in accordance with the outputs $V_1$, $V_1'$ of the upstream $O_2$ sensors 13A, 13B. This routine is executed at predetermined intervals such as 4 ms.

At step 201, it is determined whether or not all conditions for air-fuel ratio feedback control are satisfied. The conditions for a feedback control are, for example,
the engine is not being started,
the coolant temperature is higher than a predetermined value,
the fuel increments, such as a start-up fuel increment, a warming-up fuel increment, a power fuel increment, or an OTP fuel increment for preventing an excess rise in the temperature of the catalyst converters, are not being carried out,
the outputs of the upstream $O_2$ sensors 13A, 13B have been reversed (i.e., changed from a rich air-fuel ratio output signal to a lean air-fuel ratio output signal or vice versa) at least once,
a fuel cut operation is not being carried out.

If any one of these conditions is not satisfied the routine is terminated at step 305, and if all of these conditions are satisfied the routine proceeds to step 202.

At step 202, it is determined whether or not the conditions for detecting the deterioration of the catalyst converters are satisfied. These conditions include, for example, that both the engine load (represented by $Q/N_e$) and the speed ($N_e$) are stable.

If these conditions are not satisfied in step 202, the routine proceeds to step 203 in which the air-fuel ratio correction factor FAFA for the cylinder bank A and FAFB for the cylinder bank B are calculated separately. Namely, the correction factor FAFA is calculated in accordance with the output $V_1$ of the upstream $O_2$ sensor 13A and the output $V_2$ of the downstream $O_2$ sensor 17, and the correction factor FAFB is calculated in accordance with the output $V_1'$ of the upstream $O_2$ sensor 13B and the output $V_2$ of the downstream $O_2$ sensor 17, respectively.

On the other hand, if the required conditions are satisfied in step 202, the routine proceeds to step 204 in which both correction factors FAFA and FAFB are calculated simultaneously in accordance with the outputs of the sensors.

Namely, both of the correction factors FAFA and FAFB are calculated in accordance with the output $V_1$ of the upstream $O_2$ sensor 13A and the output $V_2$ of the downstream $O_2$ sensor 17.

FIG. 3 is a routine for calculating the air-fuel ratio correction factors FAFA and FAFB separately, and corresponds to step 203 of FIG. 2.

Figure 3A:
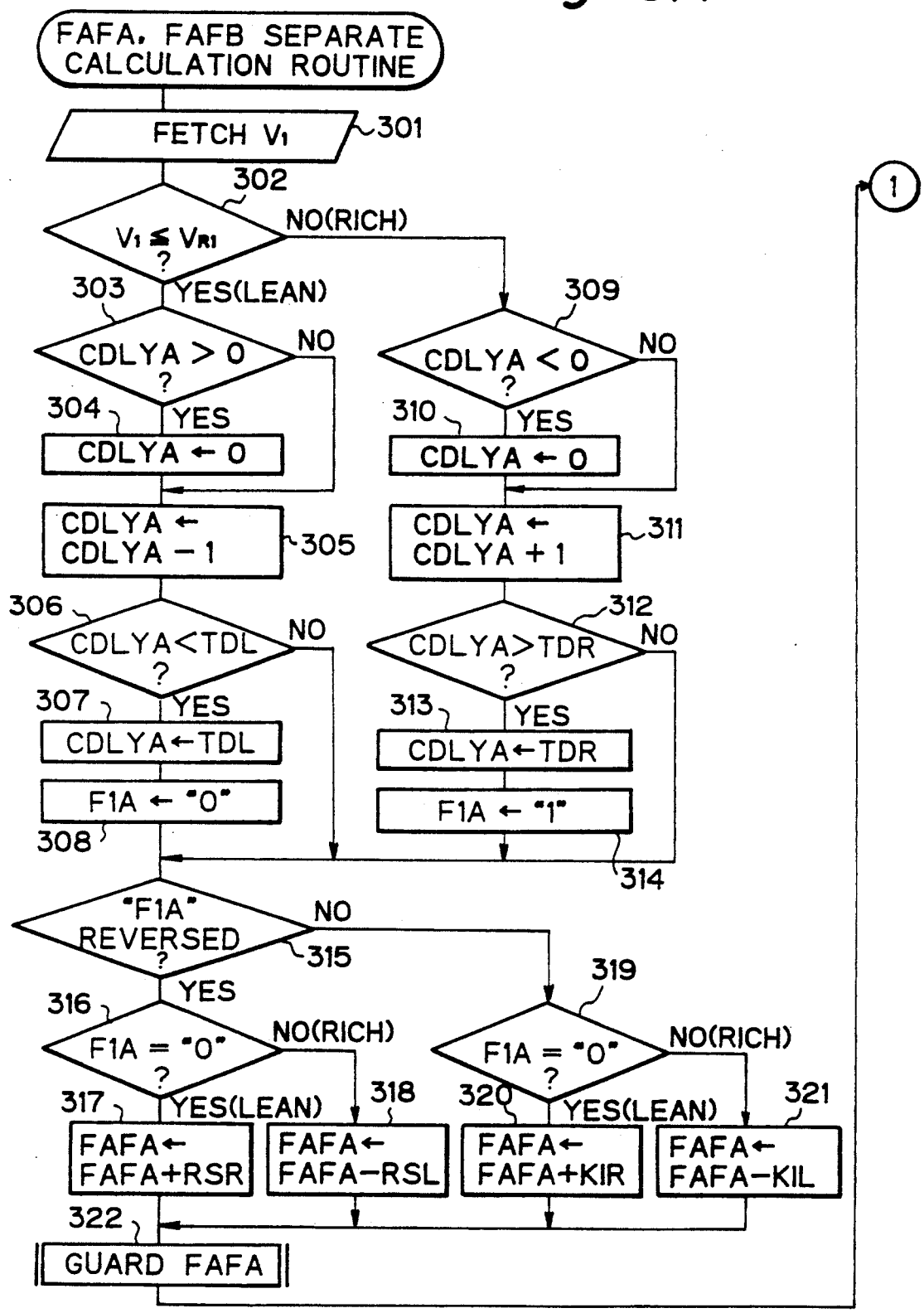
Figure 3B:
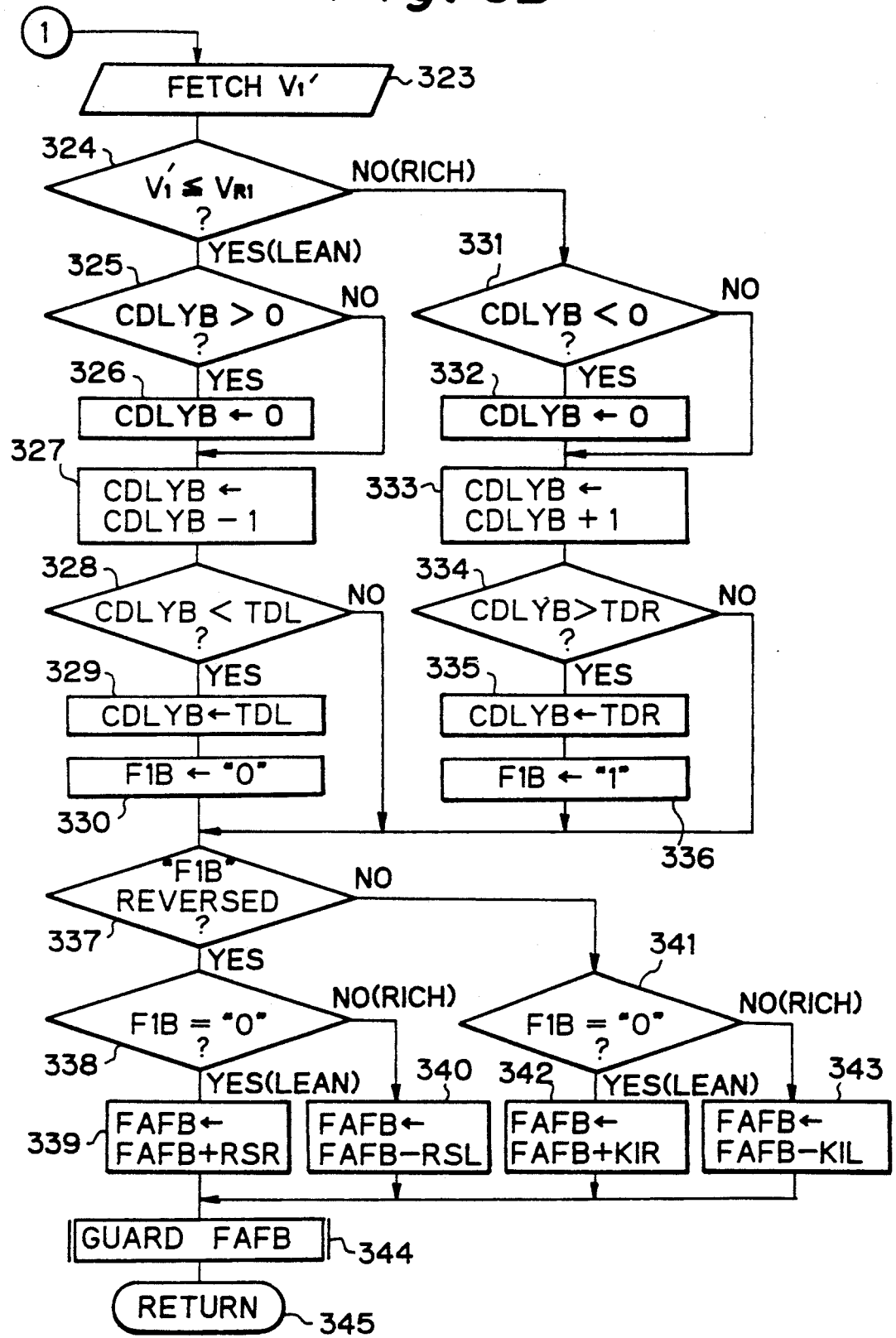

In FIG. 3A, steps from 301 to 322 are used for calculating the air-fuel ratio correction factor FAFA, and steps from 323 to 344, which are similar to steps from 301 to 322, are used for calculating the air-fuel ratio correction factor FAFB.

At step 301, an A/D conversion is performed upon the output voltage $V_1$ of the upstream $O_2$ sensor 13A, and the A/D converted value thereof is then fetched from the A/D converter 101. Then, at step 302, the voltage $V_1$ is compared with a reference voltage $V_{R1}$ such as 0.45 V, to thereby determine whether the current air-fuel ratio detected by the upstream $O_2$ sensor 13A is on the rich side or on the lean side with respect to the stoichiometric air-fuel ratio.

If $V_1 \leq V_{R1}$, which means that the current air-fuel ratio is lean, the control proceeds to step 303, at which it is determined whether or not the value of a delay counter CDLYA is positive. If CDLYA>0, the control proceeds to step 304, which clears the delay counter CDLYA, and then proceeds to step 305. If CDLYA≦0, the control proceeds directly to step 305. At step 405, the delay counter CDLYA is counted down by 1, and at step 306, it is determined whether or not CDLYA<TDL. Note that TDL is a lean delay time for which a rich state is maintained even after the output of the upstream $O_2$ sensor 13A is changed from the rich side to the lean side, and is defined by a negative value. Therefore, at step 306, only when CDLYA<TDL does the control proceed to step 307, which causes CDLYA to be TDL, and then to step 308, which causes an air-fuel ratio flag F1A to be "0" (lean state). On the other hand, if $V_1 > V_{R1}$, which means that the current air-fuel ratio is rich, the control proceeds to step 309, which determines whether or not the value of the delay counter CDLYA is negative. If CDLYA<0, the control proceeds to step 310, which clears the delay counter CDLYA, and then proceeds to step 311. If CDLYA≧0, the control directly proceeds to step 311. At step 311, the delay counter CDLYA is counted up by 1, and at step 312, it is determined whether or not CDLYA>TDR. Note that TDR is a rich delay time for which a lean state is maintained even after the output of the upstream $O_2$ sensor 13A is changed from the lean side to the rich side, and is defined by a positive value. Therefore, at step 312, only when CDLYA>TDR does the control proceed to step 313, which causes CDLYA to be TDR, and then to step 314, which causes the air-fuel ratio flag F1A to be "1" (rich state).

Next, at step 315, it is determined whether or not the air-fuel ratio flag F1A is reversed, i.e., whether or not the delayed air-fuel ratio detected by the upstream $O_2$ sensor 13A is reversed. If the air-fuel ratio flag F1A is reversed, the control proceeds to steps 316 to 318, which carry out a skip operation. That is, if the flag F1A is "0" (lean) at step 316, the control proceeds to step 317, which remarkably increases the correction factor FAFA by a skip amount RSR. Also, if the flag F1A is "1" (rich) at step 316, the control proceeds to step 318, which remarkably reduces the correction factor FAFA by the skip amount RSL. On the other hand, if the air-fuel ratio flag F1A is not reversed at step 315, the control proceeds to steps 319 to 321, which carry out an integration operation. That is, if the flag F1A is "0" (lean) at step 319, the control proceeds to step 320, which gradually increases the correction factor FAFA by a rich integration amount KIR. Also, if the flag F1A is "1" (rich) at step 319, the control proceeds to step 321, which gradually reduces the correction factor FAFA by a lean integration amount KIL.

Then, at step 322, the air-fuel ratio correction factor FAFA is guarded, for example, by a minimum value of 0.8 and by a maximum value of 1.2, to thereby prevent the controlled air-fuel ratio from becoming overrich or overlean.

The correction factor FAFA is then stored in the RAM 105 and the routine proceeds to step 323.

In the steps 323 to 344 (FIG. 3B), the air-fuel ratio correction factor FAFB is calculated in accordance with the output $V_1'$ of the upstream $O_2$ sensor 13B. The steps from 323 to 344 correspond exactly to the steps from 301 to 322 of FIG. 3A, and therefore, a repeated explanation thereof will be omitted.

FIG. 4 shows a routine for calculating both of the air-fuel ratio correction factors FAFA and FAFB simultaneously, and corresponds to step 204 of FIG. 2.

Figure 4A:
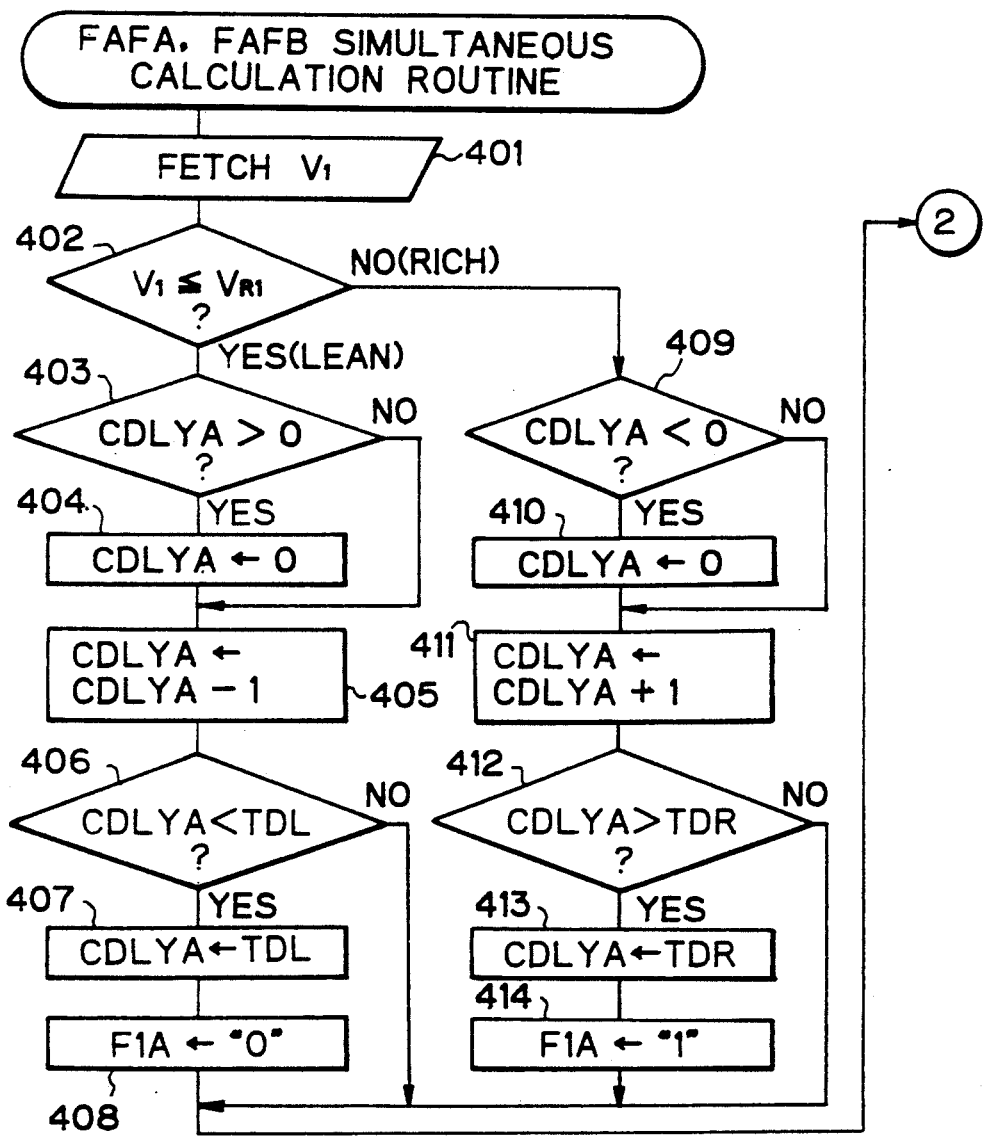

At step 401 of FIG. 4A, an A/D conversion is performed upon the output voltage $V_1$ of the upstream $O_2$ sensor 13A, and the A/D converted value thereof is then fetched from the A/D converter 101. Then, at step 402, the voltage $V_1$ is compared with the reference voltage $V_{R1}$, to thereby determine whether the current air-fuel ratio detected by the upstream $O_2$ sensor 13A is on the rich side or on the lean side with respect to the stoichiometric air-fuel ratio.

If $V_1 \leq V_{R1}$, the control proceeds to step 403, which determines whether or not the value of a first delay counter CDLYA is positive. If CDLYA>0, the control proceeds to step 404, which clears the delay counter CDLYA, and then proceeds to step 405. If CDLYA≦0, the control proceeds directly to step 405. At step 405, the delay counter CDLYA is counted down by 1, and at step 406, it is determined whether or not CDLYA<TD. At step 406, only when CDLYA<TDL does the control proceed to step 407, which causes the CDLYA to be TDL and then to step 408, which causes the air-fuel ratio flag F1A to be "0" (lean state). On the other hand, if $V_1 > V_{R1}$, the control proceeds to step 409, which determines whether or not the value of the delay counter CDLYA is negative. If CDLYA<0, the control proceeds to step 410, which clears the delay counter CDLYA, and then proceeds to step 411. If CDLYA≧0, the control directly proceeds to 411. At step 411, the delay counter CDLYA is counted up by 1, and at step 412, it is determined whether or not CDLYA>TDR. At step 412, only when CDLYA>TDR does the control proceed to step 413, which causes CDLYA to be TDR, and then to step 414, which causes the air-fuel ratio flag F1A to be "1" (rich state).

Figure 4B:
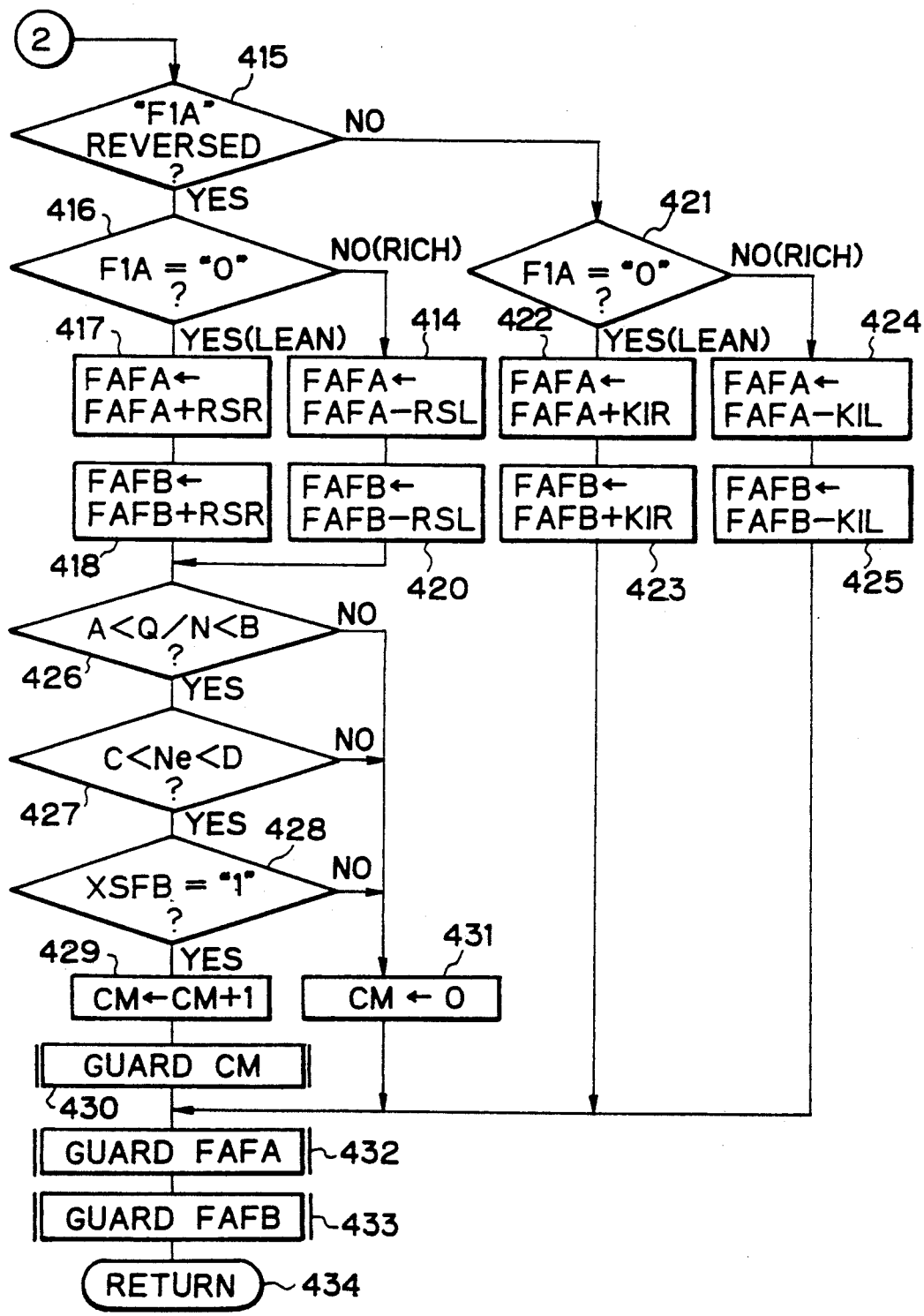

Next, at step 415 of FIG. 4B, it is determined whether or not the air-fuel ratio flag F1A is reversed, i.e., whether or not the delayed air-fuel ratio detected by the upstream $O_2$ sensor 13A is reversed. If the air-fuel ratio flag F1A is reversed, the control proceeds to steps 416 to 420, which carry out a skip operation. That is, if the flag F1A is "0" (lean) at step 416, the control proceeds to steps 417 to 418 which remarkably increase both of the correction factors FAFA and FAFB by a same skip amount RSR. Also, if the flag F1A is "1" (rich) at step 416, the routine proceeds to steps 419 to 420, which remarkably reduce both of the correction factors FAFA and FAFB by a same skip amount RSL. If the air-fuel ratio flag F1A is not reversed at step 415, the control proceeds to steps 421 to 425, which carry out an integration operation. That is, if the flag F1A is "0" (lean) at step 421, the control proceeds to steps 422 to 423, which gradually increase both of the correction factors FAFA and FAFB by the rich integration amount KIR. If the flag F1A is "1" (rich) at step 421, the control proceeds to steps 424 to 425, which gradually reduce both of the correction factors FAFA and FAFB by the lean integration amount KIL.

Further, when the skip operation is carried out, the number of the reversal CM of the output $V_1$ of the upstream $O_2$ sensor 13A is counted in the steps 426 to 430. Namely, at step 426, it is determined whether or not the amount of intake air per one revolution of the engine, $Q/N_e$, is within a predetermined range ($A < Q/N_e < B$). Also, at step 427, it is determined whether or not the engine speed $N_e$ is within a predetermined range ($C < N_e < D$). Further, at step 428, it is determined whether or not the flag XSFB is set (XFSB="1"). The flag XSFB is set ("1") only when the conditions for the air-fuel ratio feedback control by the downstream $O_2$ sensor 17 are satisfied. Therefore, the counter CM is counted up by 1 at step 429 only when all of the conditions at steps 426 to 428 are satisfied. Then the counter CM is guarded by a predetermined maximum value at step 430. If any of the conditions at steps 426 to 428 are not satisfied, the routine proceeds to step 431, which clears the counter CM. The correction factors FAFA and FAFB, which are calculated by steps 417, 418, 422, 424 and steps 418, 419, 423, 425 respectively, are guarded by a minimum value of 0.8 and a maximum value of 1.2, for example, at steps 432 and 433, to thereby prevent the controlled air-fuel ratio from becoming overrich or overlean.

By the routine of FIG. 4, both the air-fuel correction factors FAFA and FAFB are changed by a same amount of delay time, a same skip amount and a same integration amount, in a synchronous operation. Consequently, the air-fuel ratios of the cylinder bank A and the cylinder bank B alternate synchronously at a same alternating period. Therefore, in this condition, it becomes possible to detect the deterioration of the catalyst converters 12A, 12B, and 16, by comparing the alternating periods of the outputs of the upstream $O_2$ sensor 13A (or 13B) and the downstream $O_2$ sensor 17.

The control operation by the flow charts of FIGS. 3 and 4 are further explained with reference to FIGS. 5A through 5D. To simplify the explanation, FIGS. 5A through 5D illustrate an air-fuel ratio control of the cylinder bank A (particularly, the control by steps from 301 to 322), but the same explanation can be applied to the control of the cylinder bank B.

As illustrated in FIG. 5A, when the air-fuel ratio A/F is obtained by the output of the upstream $O_2$ sensor 13A, the delay counter CDLYA is counted up during a rich state, and is counted down during a lean state, as illustrated in FIG. 5B. As a result, a delayed air-fuel ratio corresponding to the air-fuel ratio flag F1A is obtained as illustrated in FIG. 5C. For example, at time t:, even when the air-fuel ratio A/F is changed from the lean side to the rich side, the delayed air-fuel ratio F1A is changed at time $t_2$ after the rich delay time TDR. Similarly, at time t:, even when the air-fuel ratio A/F is changed from the rich side to the lean side, the delayed air-fuel ratio F1A is changed at time $t_4$ after the lean delay time TDL. At time $t_5$, $t_6$, or $t_7$, however, when the air-fuel ratio A/F is reversed in a shorter time than the rich delay time TDR or the lean delay time TDL, the delayed air-fuel ratio F1A is reversed at time $t_8$. That is, the delayed air-fuel ratio F1A is stable when compared with the air-fuel ratio A/F. Further, as illustrated in FIG. 5D, at every change of the delayed air-fuel ratio F1A from the rich side to the lean side, or vice versa, the correction factor FAF is skipped by the skip amount RSR or RSL, and the correction factor FAF is gradually increased or reduced in accordance with the delayed air-fuel ratio F1A.

Air-fuel ratio feedback control operations by the downstream $O_2$ sensor 17 will be explained.

Generally, three types of air-fuel ratio feedback control operations by the downstream $O_2$ sensor 17 are used, i.e., the operation type in which one or more of the parameters such as the skip amounts RSR, RSL, integration amount KIR, KIL and delay times TDR, TDL are variable, and the operation type in which the reference voltage $V_{R1}$ of the outputs $V_1$, $V_1'$ of the upstream $O_2$ sensors are variable, or, the operation type in which a second air-fuel ratio correction factor FAF2 calculated in accordance with the output of the downstream $O_2$ sensor 17 is introduced.

For example, if the rich skip amount RSR is increased or if the lean skip amount RSL is decreased, the controlled air-fuel ratio of cylinder banks A, B becomes richer, and if the lean skip amount RSL is increased or if the rich skip amount RSR is decreased, the controlled air-fuel ratio of cylinder banks A, B becomes leaner. Thus, the air-fuel ratio can be controlled by changing the rich skip amount RSR and the lean skip amount RSL in accordance with the output of the downstream $O_2$ sensor 17. Further, if the rich integration amount KIR is increased or if the lean integration amount KIL is decreased, the controlled air-fuel ratio of cylinder banks A, B becomes richer, and if the lean integration amount KIL is increased or if the rich integration amount KIR is decreased, the controlled air-fuel ratio of cylinder banks A, B becomes leaner. Thus, the air-fuel ratio can be controlled by changing the rich integration amount KIR and the lean integration amount KIL in accordance with the output of the downstream $O_2$ sensor 17. Further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 17.

Also, if the rich delay time becomes longer than the lean delay time (TDR>TDL), the controlled air-fuel ratio becomes richer, and if the lean delay time becomes longer than the rich delay time (TDL>TDR), the controlled air-fuel ratio becomes leaner. Thus the air-fuel ratio can be controlled by changing the rich delay time period TDR and the lean delay time period TDL in accordance with the output of the downstream $O_2$ sensor 17.

These types of operation of the air-fuel ratio have respective advantages. For example, if the delay times TDR, TDL are variable, a precise control of the air-fuel ratio can be obtained, and if the skip amounts RSR, RSL are variable the response of the control is improved. Naturally, two or more of these operation types can be used at the same time.

FIG. 6 is a flow chart of the control operation of the double $O_2$ sensor system in which the skip amounts RSR, RSL are varied in accordance with the output $V_2$ of the downstream $O_2$ sensor 17. This routine is executed at predetermined intervals such as 512 ms.

Figure 6A:
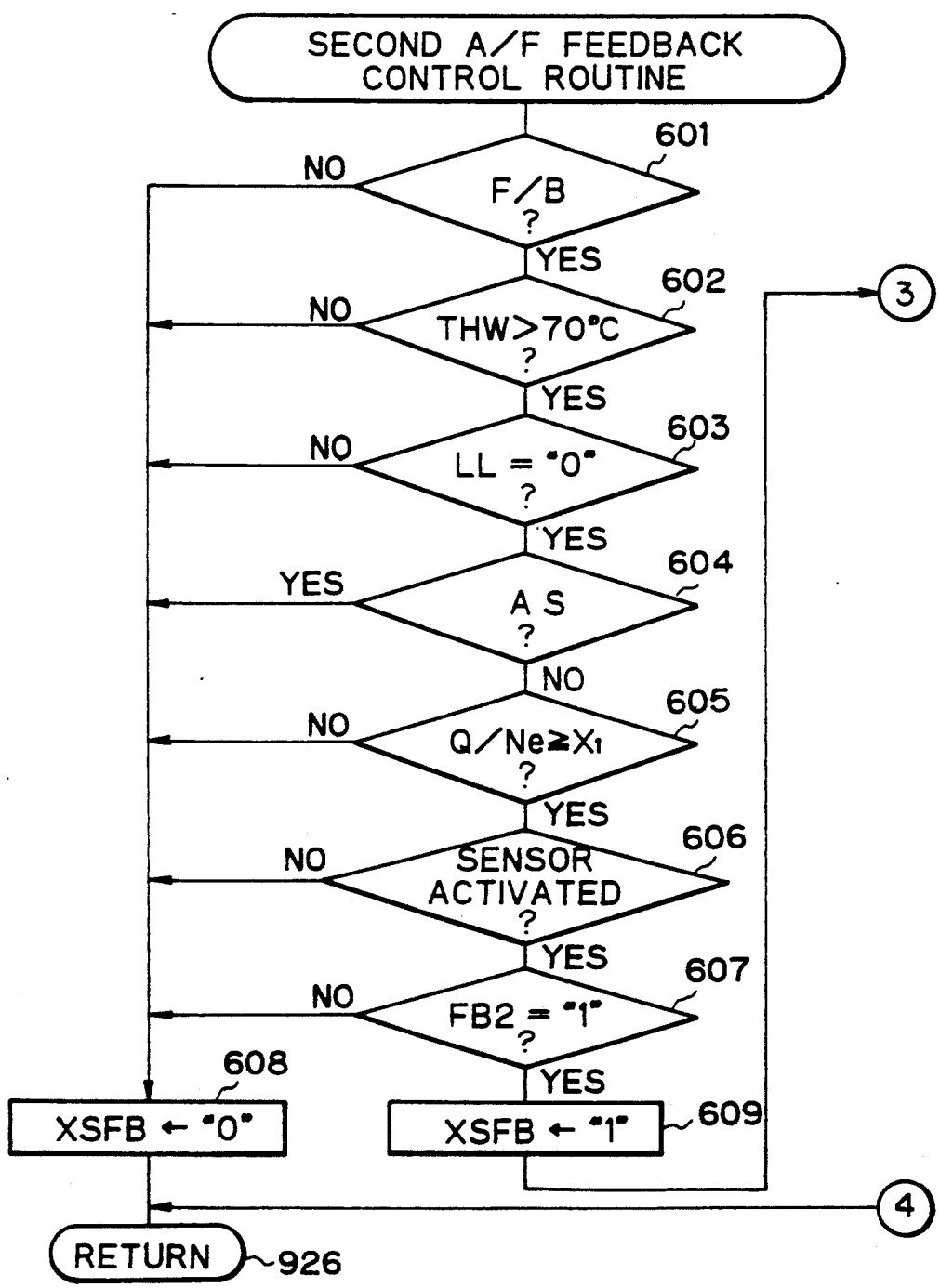

The steps from 601 to 607 of FIG. 6A show the operation for determining whether the conditions for executing the feedback control based on the output of the downstream $O_2$ sensor 17 are satisfied.

These conditions are,
the conditions for executing the air-fuel ratio feedback control based on the outputs of the upstream $O_2$ sensors 13A, 13B are satisfied (step 601),
the temperature THW of coolant is higher than a predetermined value (e.g., 70° C.) (step 602),
the throttle valve 18 is not fully closed (i.e., the signal LL is not ON), (step 603),
the secondary air AS is not introduced to the exhaust manifold 11A, 11B (step 604),
the load of the engine represented by $Q/N_e$ is more than a predetermined value $X_1$ (i.e., $Q/N_e \geq X_1$), (step 605),
the downstream $O_2$ sensor 17 is activated (step 606),
the catalyst converters 12A, 12B, 16 are not deteriorated (a flag FB2 is set), (step 607), where, the flag FB2 is reset (="0"), by the routine explained later, when the catalyst converters are determined to have deteriorated.

If any one of these conditions is not satisfied, the routine proceeds to step 608 in which an air-fuel ratio feedback control operation flag XSB is reset (="0").

Figure 6B:
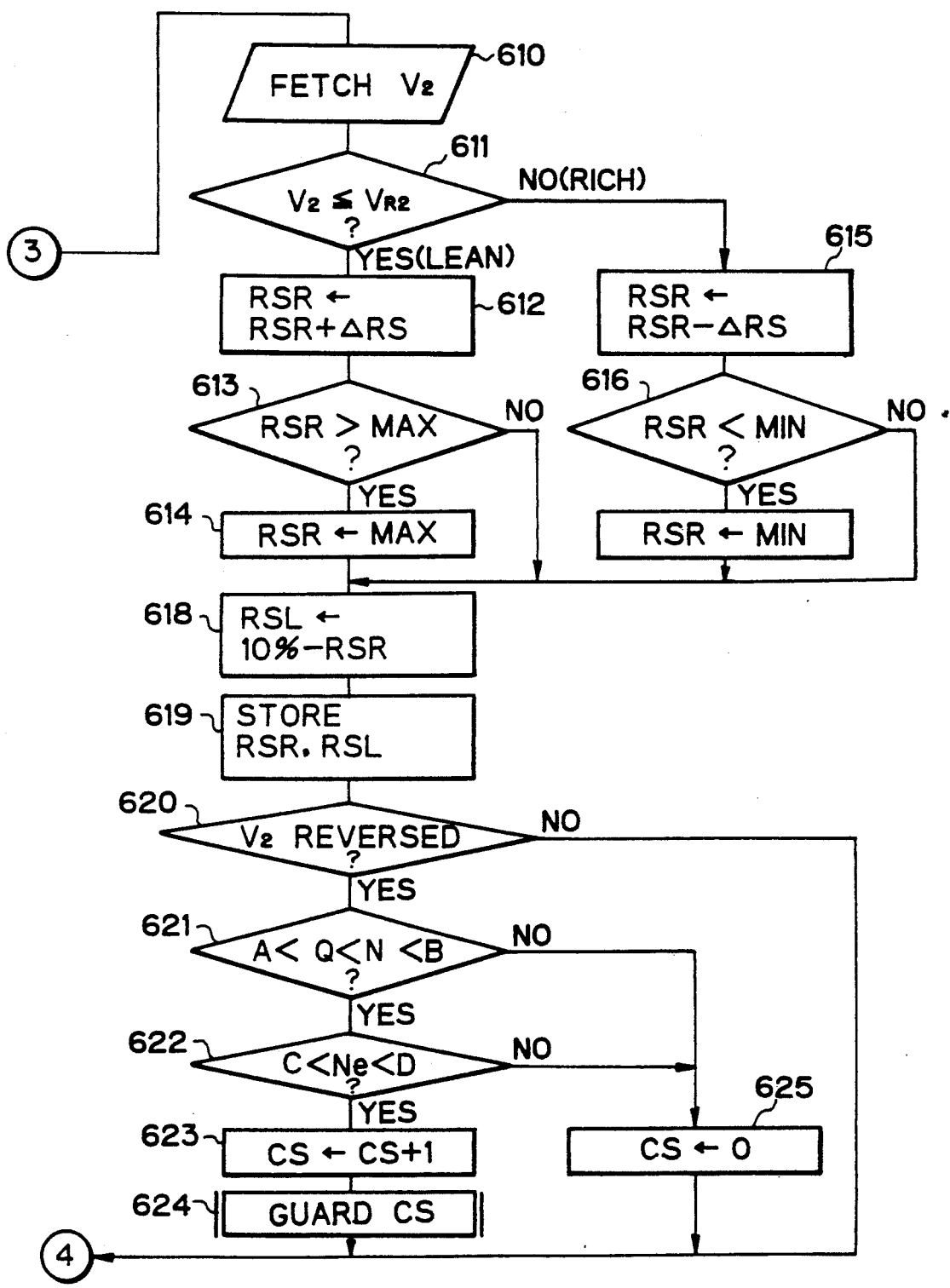

If all of the conditions of steps 601 to 607 are satisfied, the flag XSFB is set (="0") at step 609, and the routine proceeds to step 610 of FIG. 6B.

The steps 610 through 619 illustrate the operation for calculating the skip amounts RSR or RSL in accordance with the output $V_2$ of the downstream $O_2$ sensor 17.

At step 610, an A/D conversion is performed on the output voltage $V_2$ of the downstream $O_2$ sensor 17, and the A/D converted value thereof is then fetched from the A/D converter 101. Then, at step 611, the voltage $V_2$ is compared with a reference voltage $V_{R2}$ such as 0.55 V, to thereby determine whether the current air-fuel ratio detected by the downstream $O_2$ sensor 17 is on the rich side or on the lean side with respect to the stoichiometric air-fuel ratio. Note that the reference voltage $V_{R2}$ (=0.55 V) is preferably higher than the reference voltage $V_{R1}$ (=0.45 V), in consideration of the difference in output characteristics and deterioration speed between the $O_2$ sensors 13A, 13B, upstream of the catalyst converters and the $O_2$ sensor 17 downstream of the catalyst converters.

If $V_2 \leq V_{R2}$ (lean state) at step 611, then the routine proceeds to steps 612 to 614, and if $V_2 > V_{R2}$ (rich state), the routine proceeds to steps 615 to 617. Namely, at step 612, the rich skip amount RSR is increased by $\Delta$RS (constant value), to thereby shift the air-fuel ratio to the rich side. Then at steps 613 and 614, the skip amount RSR is guarded by a maximum value MAX (e.g., approximately 7.5%). On the other hand, at step 615, the rich skip amount is decreased by $\Delta$RS, to thereby shift the air-fuel ratio to lean side. Then, at steps 616 and 617, the rich skip amount RSR is guarded by a minimum value MIN (e.g., approximately 2.5%). The maximum value MAX is selected so that the amount of change of the air-fuel ratio is maintained within a range which does not worsen a drivability, and the minimum value MIN is selected so that the response of the control in a transient condition is not worsened.

At step 618, the lean skip amount RSL is calculated by $$RSL \Theta 10\% - RSR.$$

Namely, a sum of RSR and RSL is maintained at 10%. Then at step 619, the skip amounts RSR and RSL are stored in the backup RAM 106.

Step 620 through 625 show the operation for counting the number of reversals of the output $V_2$ of the downstream $O_2$ sensor 17.

At step 620, it is determined whether or not the output $V_2$ of the downstream $O_2$ sensor 17 is reversed. (i.e., whether or not the output $V_2$ changed from a rich state to a lean state or from a lean state to a rich state, compared with a stoichiometric air-fuel ratio). If the output $V_2$ is reversed, the routine proceeds to step 620 which determines whether or not the load of the engine (represented by the amount of intake air per one revolution of the engine, $Q/N_e$) is within the predetermined range ($A < Q/N_e < B$), and at step 622, it is determined whether or not the engine speed $N_e$ is within the predetermined range ($C < N_e < D$). When all of the conditions at steps 620 to 622 are satisfied, i.e., only when the output $V_2$ is reversed under a stable operating condition ($A < Q/N_e < B$ and $C < N_e < D$), a counter CS is counted up by 1 at step 623, and guarded by a predetermined maximum value at step 624. If any one of the conditions at steps 620 to 622 is not satisfied, the counter CS is cleared at step 625, and the routine terminated at step 626.

Figure 7:
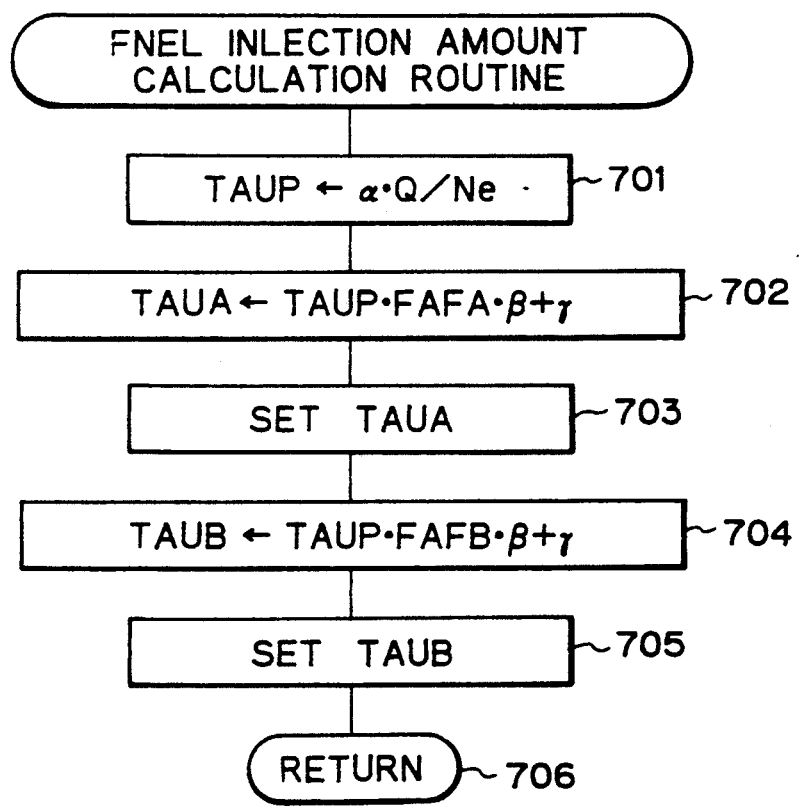

FIG. 7 shows a routine for calculating the fuel injection amount using the air-fuel ratio correction factors FAFA and FAFB calculated by the routines of FIGS. 3 and 4.

At step 701, a basic fuel injection amount TAUP is calculated in accordance with the amount of the intake air per one revolution of the engine, $Q/N_e$, by $$TAUP \Theta \alpha \cdot Q/N_e$$

where $\alpha$ is a constant.

Then, at step 702, a fuel injection amount TAUA for the cylinder bank A is calculated by $$TAUA \Theta TAUP \cdot FAFA \cdot \beta + \gamma$$

where, $\beta$ and $\gamma$ are correction factors determined by an operating condition of the engine. The calculated TAUA is set to the down counter 108A for the cylinder bank A and a flip-flop 109A is set at step 703, whereby a fuel injection is started in the cylinder bank A. Similarly at steps 704, 705, a fuel injection amount TAUB for the cylinder bank B is calculated and set to the down counter 108B for the cylinder bank B, whereby a fuel injection is started in the cylinder bank B.

As stated before, when the time corresponding to TAUA or TAUB has lapsed, the flip-flop 109A or 109B is reset by the signal from the down counter 108A or 108B, whereby the fuel injection is terminated.

The constants $\alpha$, $\beta$, $\gamma$ in steps 701, 702, 704 can be set at different values for cylinder banks A and B.

FIG. 8 shows the routine for determining whether or not the catalyst converters have deteriorated to an extent such that the air-fuel ratio feedback control by the output $V_2$ of the downstream $O_2$ sensor 17 is adversely affected. This routine is executed at predetermined intervals such as 4 ms.

When the routine is started, it is determined at step 801 whether or not the value of the counter CM (i.e., the number of reversals of the output $V_2$ of the upstream $O_2$ sensor 13A, see FIG. 4B) has become larger than a predetermined value n. The routine proceeds to steps 802 to 807 only if CM>n at step 801, and otherwise proceeds directly to step 808.

At step 802, using the values of the counter CM (FIG. 4B) and CS (FIG. 6B), it is determined whether or not a ratio CS/CM is larger than a predetermined value k (for example, k=0.5). As explained before, when the catalyst converters are deteriorated, the number of reversals (i.e., period of alternating) of the output $V_2$ of the downstream $O_2$ sensor 17 becomes almost the same as the number or reversals (i.e., period of alternating) of the output $V_1(V_1')$ of the upstream $O_2$ sensor 13A (13B). Therefore, the ratio of the number of the reversals, CS/CM, becomes larger as the catalyst converters are further deteriorated.

Then, if CS/CM$\geq$k at step 802, it is determined that the catalyst converters are deteriorated and the routine proceeds to step 803, at which the flag FB2 is reset (="0") to indicate that the catalyst converters are deteriorated. On the other hand, if CS/CM<k at step 802, the flag FB2 is set (="1") at step 804 to indicate that the catalyst converters are in the normal state. The value of the flag FB2 is stored in the backup RAM 106 at step 805, for future inspection and maintenance. At steps 806 and 807, the counters CM, CS are cleared and the routine is terminated at step 808.

Although the deterioration of the catalyst converter is detected by measuring the alternating period of the output of the downstream $O_2$ sensor in the above embodiment, the present invention can be applied to other types of detecting methods, such as by comparing the output characteristics (output waveforms) of the downstream $O_2$ sensor before and after the deterioration of the catalyst converter. These output characteristics may be, for example, the length of the path swept by the output voltage of the downstream O$_2$ sensor, or the magnitude of the area surrounded by the path swept by the output voltage of the downstream O$_2$ sensor and a predetermined voltage line.

Further, although both of upstream and downstream O$_2$ sensors are used for the air-fuel ratio control in this embodiment, the air-fuel ratio control may be carried out only using the upstream O$_2$ sensors. In this case, the downstream O$_2$ sensor is only used for detecting the deterioration of the catalyst converter.

Figure 9A:
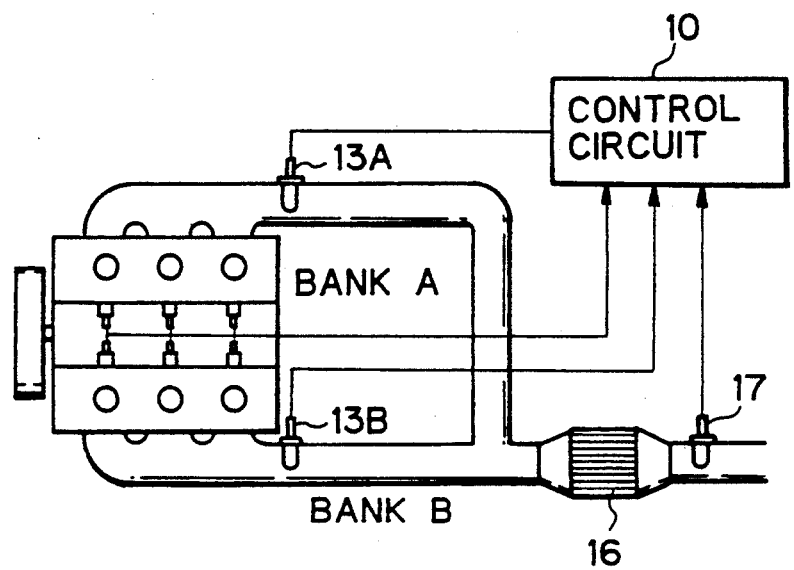
FIGS. 9A and 9B show the embodiment of the present invention shown in FIG. 1, when applied to different types of engines.
Figure 9B:
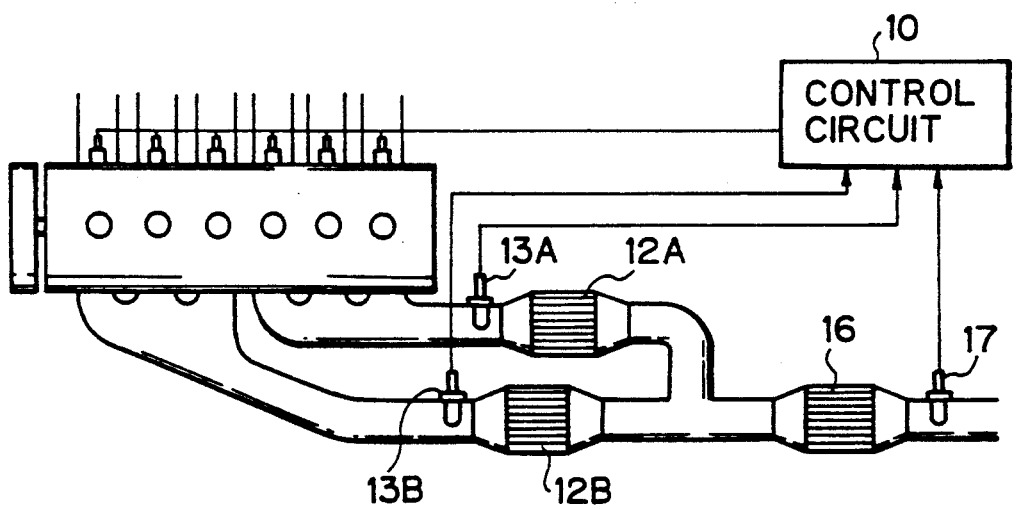
Figure 10:
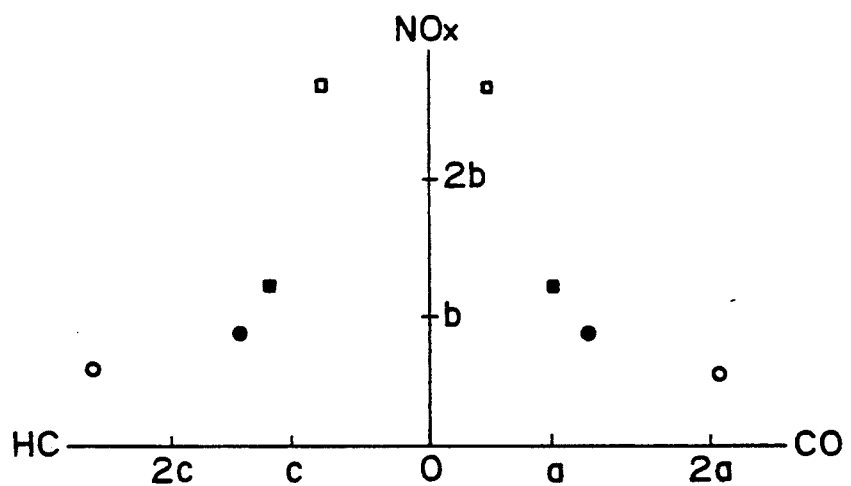
FIG. 10 is a graph showing the emission characteristics of a single $O_2$ sensor system and a double $O_2$ sensor system.

Also, the above embodiment describes the case in which three catalyst converters, i.e., 12A, 12B for cylinder banks A and B, and 16 at the common exhaust pipe 15 are used, but the present invention can be applied to the exhaust system having only one catalyst converter 16 at the common exhaust piping as shown in FIG. 9(A), or to the exhaust system having converters 12A, 12B only (without the converter 16). Further, the present invention also can be applied to in-line engines having a plurality of cylinder groups as shown in FIG. 9(B) or other type engines having more than two cylinder groups, as well as a V-type engine or a horizontally opposed engine.

Further, in the above embodiment, the operations for detecting the deterioration of the catalyst converters (FIGS. 4 and 8) are carried out whenever the engine is operated at a predetermined operating condition (FIG. 2, step 202). Consequently, the air-fuel ratio correction factors FAFA and FAFB also are calculated at the same time whenever the engine is operated at the predetermined condition. This may cause a worsening of the emission because the ability to separate the air-fuel ratio controls for cylinder banks A and B is lowered.

Therefore, the operation for detecting the deterioration of the catalyst converter may be carried out only when the possibility of deterioration exists. In this case, the period of the alternating of the outputs of the upstream O$_2$ sensor 13A, 13B and the downstream O$_2$ sensor 17 is also detected during the separate air-fuel control operation for the cylinder banks A and B, and the operations for detecting the deterioration of the catalyst converters (FIGS. 4 and 8) are carried out only when the ratio of the period of alternating of the sensors 13A, 13B to the sensor 17 becomes larger than a predetermined value.

Further, the present invention also can be applied to other types of air-fuel ratio feedback control operations by a double O$_2$ sensor system, in which the delay periods TDR, TDL, and the integration amount KIR, KIL are variable or a second air-fuel ratio correction factor FAF is used.

Also, in the above embodiment, O$_2$ sensors are used for air-fuel ratio sensors, but other types of sensors, such as CO sensors or lean mixture sensors, also can be used as the air-fuel ratio sensors in the present invention.

As explained above, according to the present invention, when the operations for detecting the deterioration of the catalyst converters are carried out, all of the cylinder groups are controlled simultaneously so that changes of the air-fuel ratios thereof become synchronous. Therefore, it becomes possible to detect the deterioration of the catalyst converters by comparing the outputs of the upstream air-fuel ratio sensors and the output of the downstream air-fuel ratio sensors.

I claim:

1. An air-fuel ratio control device for an engine having a plurality of cylinders divided into cylinder groups, said engine comprising, exhaust passages connected to the respective cylinder groups, a common exhaust passage with which said individual exhaust passages are merged, first air-fuel ratio sensors disposed in said individual exhaust passages to detect an air-fuel ratio of the exhaust gas, a second air-fuel ratio sensor disposed in said common exhaust passage to detect an air-fuel ratio of the exhaust gas, and at least one catalyst converter disposed upstream of said second air-fuel ratio sensor and downstream of said first air-fuel ratio sensors, said air-fuel ratio control device comprising:

a first air-fuel ratio control means for individually controlling the air-fuel ratio of each cylinder group at least in accordance with the output of the first air-fuel ratio sensor corresponding to the respective cylinder group;

a second air-fuel ratio control means for controlling the air-fuel ratio of all cylinder groups simultaneously, when the engine is operated under a predetermined operating condition;

a deterioration detecting means for determining whether or not said catalyst converter has deteriorated, by comparing the outputs of said first and second air-fuel ratio sensors when the air-fuel ratio of the cylinder groups is controlled by said second air-fuel ratio control means.

2. An air-fuel ratio control device according to claim 1, wherein said second air-fuel ratio control means controls the air-fuel ratio of all cylinder groups simultaneously, at least in accordance with an output of one of said first air-fuel ratio sensors.

3. An air-fuel ratio control device according to claim 2, wherein said second air-fuel ratio control means controls the air-fuel ratio of all cylinder groups so that the output of said one of the first air-fuel ratio sensors alternates between a rich air-fuel ratio side and a lean air-fuel ratio side periodically, compared with the stoichiometric air-fuel ratio.

4. An air-fuel ratio control device according to claim 3, wherein said deterioration detecting means includes a means for detecting the period of said alternating of outputs of said one of the first air-fuel ratio sensor, and a means for detecting the period of alternating of outputs of the second air-fuel ratio sensor between a rich air-fuel ratio side and a lean air-fuel ratio side compared with the stoichiometric air-fuel ratio caused by said control of the second air-fuel ratio control means, and determines whether or not said catalyst converter is deteriorated by comparing said alternating period of the output of the first air-fuel ratio sensor and said alternating period of the output of the second air-fuel ratio sensor.

5. An air-fuel ratio control device according to claim 4, wherein said deterioration detecting means determines that the catalyst converter is deteriorated when the ratio of the alternating period of the output of said one of the first air-fuel ratio sensor to the alternating period of the output of said second air-fuel ratio sensor becomes larger than a predetermined value.

6. An air-fuel ratio control device according to claim 1, wherein said first air-fuel ratio control means individually controls the air-fuel ratio of each cylinder group so that the output of the respective first air-fuel ratio sensor corresponding to each cylinder group alternates between a rich air-fuel ratio side and a lean air-fuel ratio side periodically, compared with the stoichiometric air-fuel ratio.

7. An air-fuel ratio control device according to claim 6, further comprising:
a means for detecting the periods of said alternating of the output of the first air-fuel ratio sensor when the engine is controlled by said first air-fuel ratio control means;
a means for detecting the period of the alternating of the output of the second air-fuel ratio sensor when the engine is controlled by said first air-fuel ratio control means; and said second air-fuel ratio controls means is allowed to control the air-fuel ratio only when the ratio of said alternating period of the output of the first air-fuel ratio sensors caused by said first air-fuel ratio control means to said alternating period of the output of the second air-fuel ratio sensors caused by said first air-fuel ratio control means becomes larger than a predetermined value.

8. An air-fuel ratio control device according to claim 1, wherein said second air-fuel ratio control means controls the air-fuel ratio of all cylinder groups simultaneously, in accordance with an output of one of said first air-fuel ratio sensors and an output of said second air-fuel ratio sensor.

9. An air-fuel ratio control device according to claim 8, wherein said second air-fuel ratio control means controls the air-fuel ratio of all cylinder groups so that the output of said one of the first air-fuel ratio sensors alternates between a rich air-fuel ratio side and a lean air-fuel ratio side periodically, compared with the stoichiometric air-fuel ratio.

10. An air-fuel ratio control device according to claim 9, wherein said deterioration detecting means includes a means for detecting the period of said alternating of outputs of said one of the first air-fuel ratio sensor, and a means for detecting the period of alternating of outputs of the second air-fuel ratio sensor between a rich air-fuel ratio side and a lean air-fuel ratio side compared with the stoichiometric air-fuel ratio caused by said control of the second air-fuel ratio control means, and determines whether or not said catalyst converter is deteriorated by comparing said alternating period of the output o the first air-fuel ratio sensor and said alternating period of the output of the second air-fuel ratio sensor.

11. An air-fuel ratio control device according to claim 10, wherein said deterioration detecting means determines that the catalyst converter is deteriorated when the ratio of the alternating period of the output of said one of the first air-fuel ratio sensor to the alternating period of the output of said second air-fuel ratio sensor becomes larger than a predetermined value.

12. An air-fuel ratio control device according to claim 1, wherein said first air-fuel ratio control means controls the air-fuel ratio of each cylinder group in accordance with the output of said first air-fuel ratio sensor corresponding to the respective cylinder group and the output of said second air-fuel ratio sensor.

13. An air-fuel ratio control device according to claim 12, wherein said second air-fuel ratio control means controls the air-fuel ratio of all cylinder groups simultaneously, at least in accordance with an output of one of said first air-fuel ratio sensors.

14. An air-fuel ratio control device according to claim 13, wherein said second air-fuel ratio control means controls the air-fuel ratio of all cylinder groups so that the output of said one of the first air-fuel ratio sensors alternates between a rich air-fuel ratio side and a lean air-fuel ratio side periodically, compared with the stoichiometric air-fuel ratio.

15. An air-fuel ratio control device according to claim 14, wherein said deterioration detecting means includes a means for detecting the period of said alternating of outputs of said one of the first air-fuel ratio sensor, and a means for detecting the period of alternating of outputs of the second air-fuel ratio sensor between a rich air-fuel ratio side and a lean air-fuel ratio side compared with the stoichiometric air-fuel ratio caused by said control of the second air-fuel ratio control means, and determines whether or not said catalyst converter is deteriorated by comparing said alternating period of the output of the first air-fuel ratio sensor and said alternating period of the output of the second air-fuel ratio sensor.

16. An air-fuel ratio control device according to claim 15, wherein said deterioration detecting means determines that the catalyst converter is deteriorated when the ratio of the alternating period of the output of said one of the first air-fuel ratio sensor to the alternating period of the output of said second air-fuel ratio sensor becomes larger than a predetermined value 17. An air-fuel ratio control device according to claim 12, wherein said second air-fuel ratio control means control the air-fuel ratio of all cylinder groups simultaneously, in accordance with an output of one of said first air-fuel ratio sensors and an output of said second air-fuel ratio sensor.

18. An air-fuel ratio control device according to claim 17, wherein said second air-fuel ratio control means controls the air-fuel ratio of all cylinder groups so that the output of said one of the first air-fuel ratio sensors alternates between a rich air-fuel ratio side and a lean air-fuel ratio side periodically, compared with the stoichiometric air-fuel ratio.

19. An air-fuel ratio control device according to claim 18, wherein said deterioration detecting means includes a means for detecting the period of said alternating of outputs of said one of the first air-fuel ratio sensor, and a means for detecting the period of alternating of outputs of the second air-fuel ratio sensor between a rich air-fuel ratio side and a lean air-fuel ratio side compared with the stoichiometric air-fuel ratio caused by said control of the second air-fuel ratio control means, and determines whether or not said catalyst converter is deteriorated by comparing said alternating period of the output of the first air-fuel ratio sensor and said alternating period of the output of the second air-fuel ratio sensor.

20. An air-fuel ratio control device according to claim 19, wherein said deterioration detecting means determines that the catalyst converter is deteriorated when the ratio of the alternating period of the output of said one of the first air-fuel ratio the alternating period of the output of said air-fuel ratio sensor becomes larger than a predetermined value.

* * * * *